(12) United States Patent
Beth (10) Patent No.: US 7,013,919 B2
(45) Date of Patent: Mar. 21, 2006

(54) THROTTLE DEVICE FOR HIGH FLUID PRESSURES

(75) Inventor: Harald Beth, Kinheim (DE)

(73) Assignee: Control Components, Inc., Rancho Santa Margarita, CA (US)

(*) Notice: Subject to any disclaimer, the term of this patent is extended or adjusted under 35 U.S.C. 154(b) by 233 days.

(21) Appl. No.: 10/624,007

(22) Filed: Jul. 21, 2003

(65) Prior Publication Data
US 2004/0045612 A1    Mar. 11, 2004

(30) Foreign Application Priority Data
Sep. 10, 2002  (DE) .......................... 202 13 940 U (51) Int. Cl.
*F16K 31/04* (2006.01)
(52) U.S. Cl. ........................ 137/625.37; 137/625.33
(58) Field of Classification Search ............. 137/625.3, 137/625.33, 625.37, 625.38, 625.39
See application file for complete search history.

(56) References Cited

U.S. PATENT DOCUMENTS

| | | | | |
|---|---|---|---|---|
| 1,938,943 A | * | 12/1933 | Terry | 137/494 |
| 2,369,242 A | * | 2/1945 | Lawler | 236/12.2 |
| 4,567,915 A | * | 2/1986 | Bates et al. | 138/42 |
| 5,887,621 A | * | 3/1999 | Doll | 137/625.38 |
| 6,394,134 B1 | * | 5/2002 | Kwon | 137/625.3 |

* cited by examiner

*Primary Examiner*—John Fox
(74) *Attorney, Agent, or Firm*—Stetina Brunda Garred & Brucker (57) ABSTRACT

A throttle device comprises a tubular outer sleeve having a plurality of outer sleeve circumferential grooves formed on an outer sleeve inner surface and intersecting a plurality of outer sleeve axial grooves formed on an outer sleeve outer surface to form outer sleeve orifices. Also included is a tubular inner sleeve concentrically disposed within the outer sleeve and having a plurality of inner sleeve circumferential grooves formed on an inner sleeve inner surface. A plurality of inner sleeve axial grooves are formed on the inner sleeve outer surface and intersect the inner sleeve circumferential grooves to form inner sleeve orifices. The offset inner and outer sleeve orifices define tortuous flow paths wherein fluid flows into the outer sleeve axial grooves, through the outer sleeve orifices, through the outer sleeve circumferential grooves, through the inner sleeve axial grooves, through the inner sleeve orifices before exiting the inner sleeve circumferential grooves.

20 Claims, 6 Drawing Sheets

THROTTLE DEVICE FOR HIGH FLUID PRESSURES

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention pertains generally to fluid control devices and, more particularly, to a throttle device for controlling and throttling high fluid pressures in equipment utilized in the oil, gas, and chemical industries as well as in power plants.

The prior art includes many fluid control devices that are configured to control the velocity of the flowing fluid. These prior art devices are typically comprised of a hollow cylinder with an arrangement of orifices through which high-pressure fluid flows. The orifices may be formed by drilling or machining of the hollow cylinder. The passage of the high-pressure fluid through these orifices results in a pressure gradient across the inside and outside walls of the cylinder. Fluid control devices are a critical component in blow-off valves where they operate as a constant and unregulated throttle device for the delivery of steam into a condenser of a power plant.

These fluid control valves or, more specifically, throttle devices, may also be utilized as a muffler in steam escape devices or in fluid disposal systems. When utilized in fluid control valves, the hollow cylinder of the throttle device often serves as a guide tube for a piston body that reciprocates within the hollow cylinder. The reciprocating piston alternately covers and uncovers a variable quantity of the orifices such that the flow rate of high-pressure fluid passing through the orifices may be regulated. The energy of the high-pressure fluid is reduced as it exits the orifices. A further drop in the pressure of the fluid occurs downstream of the throttle device at a valve seat of the fluid control valve. Yet another pressure drop of the fluid may occur downstream of the fluid control valve if a second, similarly configured hollow cylinder is included.

If the fluid flowing through the fluid control valve is in liquid form, then a high velocity of flow in localized areas of the fluid control valve may reduce the pressure of the liquid to a point which is below the vapor pressure of the liquid. The vapor pressure of a liquid is the pressure at which a portion of the liquid transitions or evaporates into a vapor, forming vapor bubbles. In a control valve, such a reduction in pressure to the level of the vapor pressure may occur downstream of an orifice screen or downstream of the valve seat. The ensuing phase transition of the liquid produces vapor or steam that has a much higher specific volume relative to the specific volume of the fluid when in liquid form. The specific volume is the volume of a substance per unit mass, and may also be defined as the reciprocal of the density of a substance.

The production of vapor from the liquid results in the production of the vapor bubbles. Because the pressure of the flowing liquid will eventually increase in a convergence zone located downstream of the localized area of low pressure, the vapor bubbles will eventually collapse under the increased pressure. The collapsing vapor bubbles at the convergence zone results in very high localized mass accelerations of the fluid, creating the risk of erosion or cavitation damage to walls or diffusers that may come into contact with the flowing fluid. Furthermore, pressure waves resulting from the phase changes of the liquid may have a detrimental effect on nearby fluid control components.

As can be seen, the velocity of the flowing fluid as it moves through the fluid control valve is a controlling factor in the useful life of the fluid control valve. The impact on the useful life of the fluid control valve is due not only to the aforementioned cavitation problems, but also due to the erosion of structural parts of nearby equipment when such equipment is impacted at high speed by droplets of liquid and small foreign particles that may be carried by the flowing fluid. A further disadvantage of a high velocity of the flowing fluid is that the control characteristics of the control valve become unpredictable and irregular. Such irregular control characteristics are the result of discontinuities in the velocity of the fluid. Discontinuities in the velocity of the fluid also create vortices in the convergence zone located behind or downstream of the valve seat of the fluid control valve. Furthermore, high noise levels, structural fatigue, and degradation of the flowing fluid are additional undesirable consequences of high-speed flow.

The above-mentioned problems associated with high-speed flow of fluids through control devices are well known in the art. Attempts to mitigate such harmful effects of high-speed flow in fluid control valves have focused on selecting and developing alloys having suitable mechanical properties. By fabricating control devices out of certain metal alloys, the useful life of control devices can be increased. However, other problems, such as the formation of harmful pressure waves, are unaffected by the choice of material. The prior art includes throttle devices that avoid the problems associated with high-speed fluid flow by incorporating configurations in the fluid control valve that may reduce the high pressures levels of the fluid. Regardless of the various alternative solutions directed towards solving the problems associated with high-speed fluid flow, many fluid control valves still utilize conventional throttle devices because of the increased complexity and the associated high costs of alternative solutions.

Several prior art patents propose solutions to the problems associated with high-speed fluid flow. One such solution is a throttle device wherein the fluid flow is partitioned into a multitude of individual flow tubes in order to effect a reduction in the energy of the flowing fluid. The reduction in the energy is brought about by an arrangement wherein the flow is directed through a plurality of channels. Each of the channels has a high aspect ratio, defined as the ratio of the channel length to the channel diameter. The channels are formed by stacking grooved plates or screens in back-to-back arrangement. The high aspect ratio channels induce a high level of viscous friction within the fluid that is flowing through the channels. The high level of viscous friction effects a reduction in the pressure of the fluid without increasing the velocity of the flow. Each of the channels may define a tortuous flow path defining a number of sudden directional changes in the fluid flow. In such tortuous flow paths, the amount of viscous friction within the fluid may be increased such that the pressure of the fluid may be further reduced.

Although the partitioning of the fluid into channels may be effective in reducing the energy of the fluid, devices incorporating individual channels suffer several drawbacks. One drawback is that the stacking of individual plates or screens is necessarily complex because a large number of plates or screens are needed in order to provide a sufficiently large cross-sectional area of flow necessary for high-flow-rate industrial applications. The cost of manufacturing and assembling the individual plates is proportional to the high quantity required for a single throttle device. Thus, a device requiring a high cross-sectional flow area may be prohibitively expensive. A second drawback is that the control characteristics of such a device are not gradual, as is desired, but rather are incremental or stepwise. This is due to the incremental blocking and unblocking of the channels by a control piston sliding within the fluid control valve. Ideally, it desirable for the fluid control valve to gradually increase and decrease the flow rate through the channels with a high degree of refinement such that the rate of flow may be more precisely regulated.

The prior art includes other throttle devices that are comprised of a single cylinder or several concentric cylinders, with each cylinder being equipped with a multitude of radially disposed holes. However these prior art throttle devices may be even less effective that throttle devices fabricated from stacks of plates. Furthermore, the manufacturing costs of throttle devices comprising concentric cylinders increases in direct proportion to the level of pressure reduction that is desired due in part to the fact that the diameter of the holes affects the noise level of the throttle device. Smaller holes in the cylinders correspond to a higher frequency of noise that is produced by fluid exiting the holes. In an effort to shift a large portion of the noise out of the humanly audible frequency range, the diameter of the holes is reduced. However, in order to constrain the pressure of the passing fluid within a given range, the required number of holes in the cylinders is inversely proportional to the diameter of the holes. Thus, for relatively small hole diameters, a relatively high quantity of holes is required for a given rate of flow. The high quantity of holes required in the cylinder results in increased complexity and higher production costs.

As can be seen, there exists a need for a throttle device that is capable of controlling and throttling high fluid pressures. Additionally, there exists a need for a throttle device that is configured for facilitating a reduction in the pressure of a fluid flowing through a fluid control device. Furthermore, there exists a need for a throttle device that is of a simple construction and which is inexpensive to manufacture.

SUMMARY OF THE INVENTION

The present invention specifically addresses and alleviates the above referenced deficiencies associated with throttle devices. More particularly, the present invention is a throttle device adapted for controlling and throttling high fluid pressures flowing therethrough so as to minimize the harmful affects associated with high-pressure or high-velocity fluid flow.

The throttle device comprises a tubular inner sleeve concentrically disposed and nested within a tubular outer sleeve. The inner and outer sleeves are cylindrically configured although the inner and outer sleeves may be conically configured. The number of sleeves can be increased or decreased in order to effect a greater or lesser degree of restrictiveness of the flow through the throttle device. The tubular outer sleeve defines a sleeve axis and has an outer sleeve inner surface and an outer sleeve outer surface. A plurality of outer sleeve circumferential grooves are formed on the outer sleeve inner surface and a plurality of outer sleeve axial grooves are formed on the outer sleeve outer surface. The intersection of the outer sleeve circumferential grooves with the outer sleeve axial grooves forms outer sleeve orifices extending through the outer sleeve.

The tubular inner sleeve has an inner sleeve inner surface and an inner sleeve outer surface. The inner sleeve is sized and configured complimentary to and concentrically disposed within the outer sleeve in telescoping fashion. The tight fit between the inner sleeve and the outer sleeve resists leakage of fluid. A plurality of inner sleeve circumferential grooves are formed on the inner sleeve inner surface and a plurality of inner sleeve axial grooves are formed on the inner sleeve outer surface. The intersection of the inner sleeve circumferential grooves with the inner sleeve axial grooves forms inner sleeve orifices extending through the inner sleeve. For applications where fluid is directed to flow from an inside to an outside of the throttle device, an end cap may be disposed in sealing engagement with the inner sleeve and outer sleeve to close off the throttle device. The end cap forces fluid to pass through the inner and outer sleeves.

The outer sleeve orifices may be axially and circumferentially offset from the inner sleeve orifices. The circumferential and axial grooves of the sleeves define multiple tortuous flow paths for fluid flowing through the throttle device. Fluid flowing inwardly from the throttle device exterior to the throttle device interior is received into the outer sleeve axial grooves. The fluid then flows through the outer sleeve orifices, along the outer sleeve circumferential grooves, into the inner sleeve axial grooves, and through the inner sleeve orifices before exiting the inner sleeve circumferential grooves. The tortuous flow path is reversed for fluid flowing outwardly from the throttle device interior to the throttle device exterior.

Advantageously, the inner and outer sleeves may be angularly adjusted relative to each other such that the respective ones of the orifices are either aligned or offset with the circumferential and axial grooves of an adjacent one of the sleeves. By offsetting the orifices in respective ones of the sleeves, an individual flow of fluid may be divided into two halves when streaming through an orifice. Concurrently, both halves of the flow will change directions by about 90 degrees with each half flowing along the circumferential groove in opposite directions until reaching a nearest one of the orifices in an adjacent one of the sleeves.

At this point, the flow encounters an oppositely moving flow head-on. During the ensuing collision of the oppositely moving flows, energy of the fluid is reduced. If an equal number of orifices are symmetrically formed within respective ones of the cylinders, the fluid will tend to flow along the axial and circumferential grooves in an unbiased direction. But even if the orifices are asymmetrically formed such that the individual flows are biased or equidirectional, energy losses will still continue within the fluid as the flows are joined when passing through the orifices. Furthermore, additional energy losses will occur in the fluid due to the directional changes or turns in the tortuous flow paths. Energy losses also occur from viscous friction within the fluid itself as well as from skin friction between the flowing fluid and the circumferential and axial grooves walls.

BRIEF DESCRIPTION OF THE DRAWINGS

These as well as other features of the present invention will become more apparent upon reference to the drawings wherein.

DETAILED DESCRIPTION OF THE INVENTION

Figure 1:
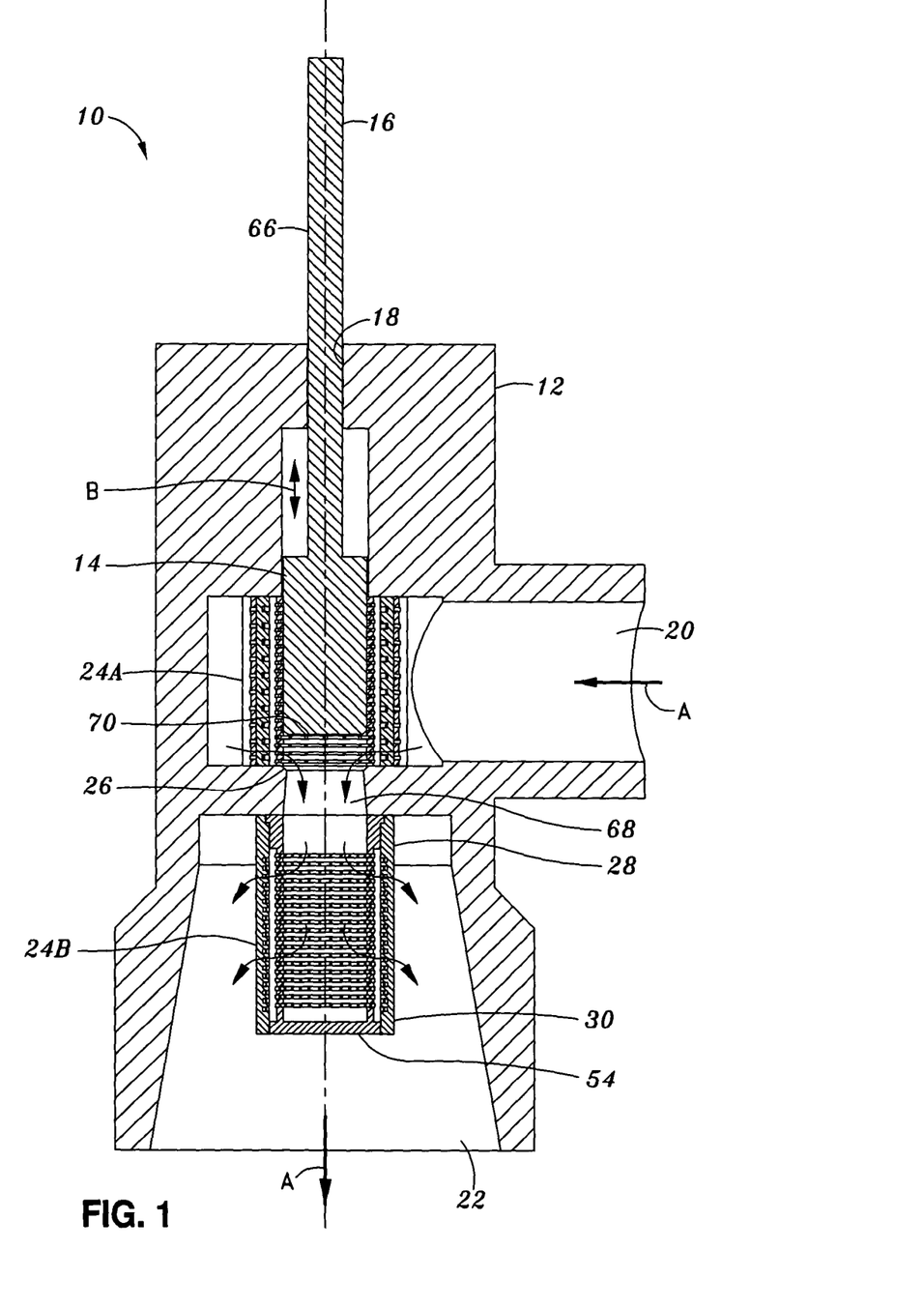
FIG. 1 is a cross-sectional view of a fluid control valve having a fluid inlet chamber and a fluid outlet chamber and illustrating a first embodiment of a throttle device shown disposed within the fluid inlet chamber, and a second embodiment of the throttle device shown disposed within the fluid outlet chamber.
Figures 4, 4A, 4B, 4C:
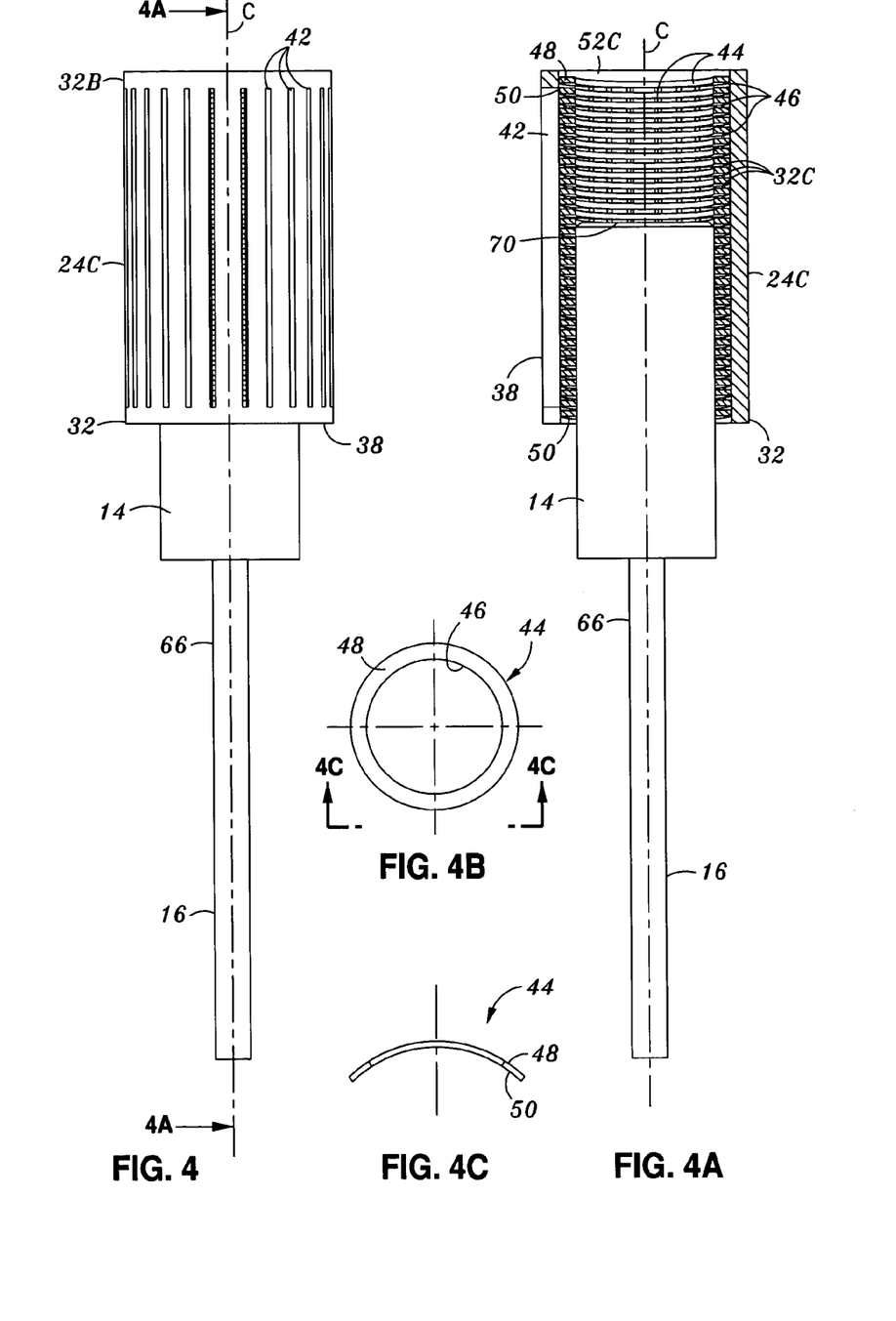
FIG. 4 is an elevational view of the inner sleeve with a piston body partially disposed therewithin and illustrating the arrangement of circumferentially-spaced, inner sleeve axial grooves.
FIG. 4A is a cross-sectional view of the inner sleeve and piston body taken along line 4A—4A of FIG. 4 illustrating a stack of axially-spaced inner sleeve rings affixed to the inner sleeve inner surface.
FIG. 4B is a top plan view of one of the inner sleeve rings shown in FIG. 4A.
FIG. 4C is a side elevational view of one of the inner sleeve rings taken alone line 4C—4C of FIG. 4B.

Referring now to the drawings wherein the showings are for purposes of illustrating the present invention and not for purposes of limiting the same, FIG. 1 illustrates a fluid control valve 10 comprised of a valve housing 12 having a fluid inlet chamber 20 and a fluid outlet chamber 22. The fluid inlet chamber 20 is in fluid communication with the fluid outlet chamber 22 via a flow opening 68 interposed therebetween. A first embodiment of a throttle device 24A of the present invention is shown in FIG. 1 disposed within the fluid inlet chamber 20 with a piston body 14 being slidably disposed within the throttle device 24A. A second embodiment of the throttle device 24B of the present invention is shown in FIG. 1 disposed within the fluid outlet chamber 22. A third embodiment of the throttle device 24C of the present invention is shown in FIG. 4 and 4A.

It should be noted that the first, second and third embodiments of the throttle devices 24A, 24B, 24C of the present invention may share a commonality of components. In this regard, some of the reference numerals that are applied to certain components of the throttle devices 24A, 24B, 24C may be utilized in any and all embodiments of the throttle device 24A, 24B, 24C. For example, some of the reference numerals that are applied to components of the first embodiment of the throttle device 24A may be applied to components of the second and third embodiments of the throttle device 24B, 24C, and vice versa.

Additionally, it should be noted that the first and third embodiments of the throttle devices 24A and 24C are interchangeable with each other. For example, in FIG. 1, although the first embodiment of the throttle device 24A is shown disposed within the fluid inlet chamber 20, the third embodiment of the throttle device 24C may be instead utilized within the fluid inlet chamber 20.

Figure 7:
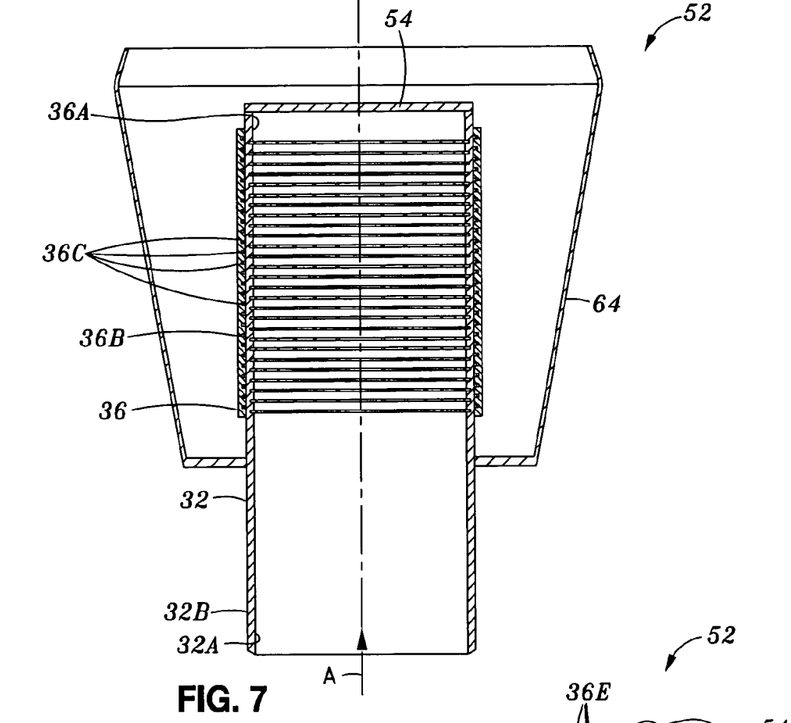
FIG. 7 is a cross-sectional view of a blow-off device disposed within a casing and illustrating an end cap disposed in sealing engagement with the inner and outer sleeves.
Figure 8:
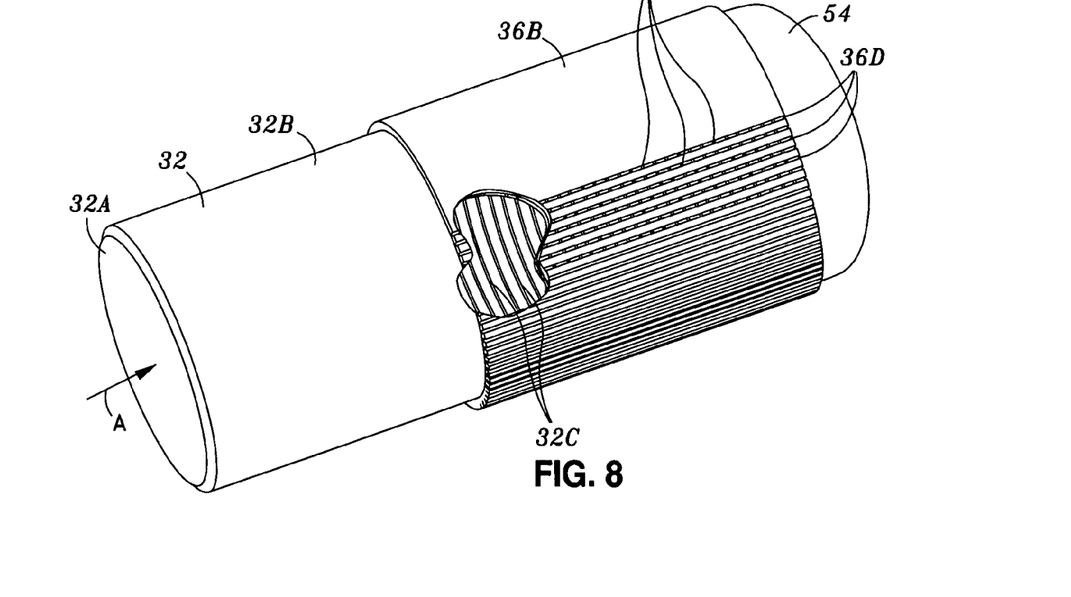
FIG. 8 is a perspective view of the blow-off device illustrating the outer sleeve axial grooves in a circumferentially biased configuration.

Furthermore, although shown as being incorporated into a fluid control valve 10, any one of the throttle devices 24A, 24B, 24C or combinations thereof may be incorporated into any number of alternate fluid control devices, including but not limited to a blow-off device 52, shown in FIGS. 7 and 8. In such a blow-off device 52, fluid under high pressure flows into an interior of the blow-off device 52 and thereafter radially exits at an exterior of the blow-off device 52 wherein pressure may be released to the atmosphere, as will be explained in further detail below. Alternatively, the blow-off device 52 may be incorporated into a condenser wherein fluid flows through the blow-off device 52 from the interior to the exterior such that steam may be released into a condenser reservoir.

Although shown in FIG. 1 as a unitary structure, the valve housing 12 may optionally be provided in a two-piece configuration comprising two halves (not shown). The two-piece configuration of the valve housing 12 may have a parting plane disposed adjacent the flow opening 68. The halves of the two-piece configuration may be threadably interconnected or attached to each other by other suitable means such as by welding or press fitting. By providing the valve housing 12 in the two-piece configuration, installation of the throttle devices 24A, 24B, 24C into the valve housing 12 may be facilitated.

Figure 2:
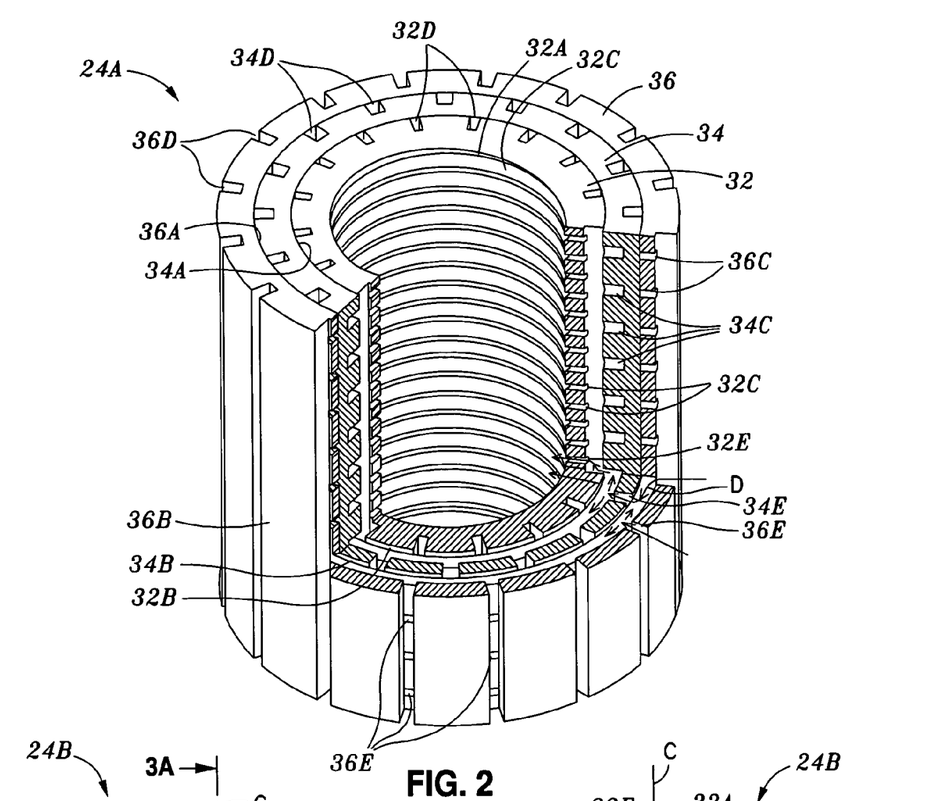
FIG. 2 is a partially cut-away perspective view of the throttle device of the first embodiment illustrating the arrangement of concentrically disposed inner, intermediate and outer sleeves and showing a tortuous flow path for fluid flowing inwardly through the throttle device.
Figure 3:
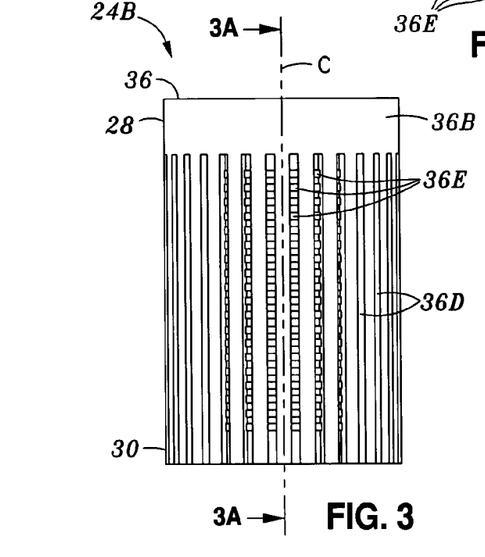
FIG. 3 is an elevational view of the throttle device of the second embodiment illustrating the arrangement of outer sleeve axial grooves disposed on an outer sleeve outer surface.
Figure 3A:
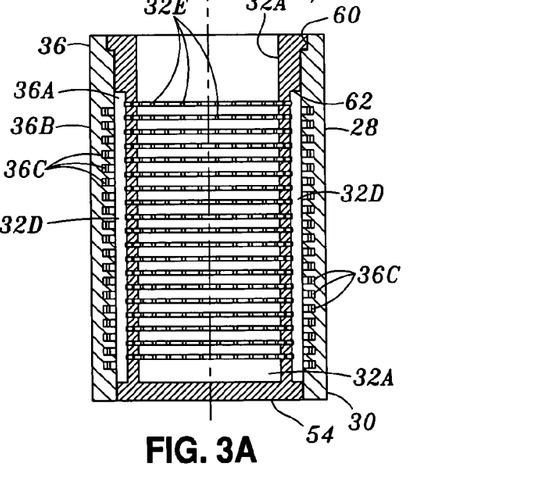
FIG. 3A is a cross-sectional view of the throttle device of the second embodiment taken along line 3A—3A of FIG. 3 illustrating the inner sleeve disposed in spaced relation to the outer sleeve and showing the inner sleeve circumferential grooves.

The throttle devices 24A and 24C are comprised of concentrically disposed inner, intermediate and outer sleeves, 32, 34, 36 as shown in FIG. 2, although a single sleeve may be utilized. Alternatively, any number of intermediate sleeves 34 may be included in throttle devices 24A and 24C. The throttle device 24B is comprised of concentrically disposed inner and outer sleeves, 32, 36, as shown in FIG. 3A, although any number of intermediate sleeves 34 may be included therein. In each of the throttle devices 24A, 24B, 24C, the fluid undergoes a pressure drop as a result of the fluid flowing though the sleeves 32, 34, 36. Circumferential grooves 32C, 34C, 36C may be formed in an inner surface 32A, 34A, 36A of respective ones of the sleeves 32, 34, 36 with axial grooves 32D, 34D, 36D being formed in an outer surface 32B, 34B, 36B of respective ones of the sleeves 32, 34, 36 at a depth such that sleeve orifices 32E, 34E, 36E are formed at intersections of the circumferential grooves 32C, 34C, 36C and the axial grooves 32D, 34D, 36D. In each of the embodiments, the throttle device 24A, 24B, 24C of the present invention facilitates a reduction in the pressure of a fluid flowing through the fluid control device so as to minimize the harmful affects associated with high-pressure or high velocity fluid flow. More specifically, the unique configuration of the throttle devices 24A, 24B, 24C reduces cavitation and erosion in fluid control devices as well as reducing high noise levels, structural fatigue and other undesirable consequences of high-pressure or high velocity fluid flow.

As can be seen in FIG. 1, the fluid control valve 10 includes a control piston 66 having a piston body 14 and a piston rod 16, each of which may be generally cylindrically configured. The piston rod 16 extends out of a bore 18 in the valve housing 12. The piston body 14 includes an end face 70 disposed opposite that from which the piston rod 16 extends. The piston body 14 may be moved between open and closed positions. In the closed position, the end face 70 of the piston body 14 is placed in sealing engagement with a valve seat 26 of the valve housing 12 adjacent the flow opening 68. The piston rod 16 may be coupled to an actuator (not shown), which is operative to move the piston body 14 in alternate directions indicated by the arrow B in FIG. 1.

As will be recognized, upon movement of the piston rod 16 to the open position, the same may be selectively returned to its closed position by the movement of the piston rod 16 in an opposite direction. The engagement of the piston body 14 to the valve seat 26 effectively blocks the flow of fluid through the flow opening 68. In this manner, the piston body 14 may be reciprocated along the direction B within the throttle device 24A of the first embodiment such that the flow rate of fluid passing through the fluid control device may be regulated. The fluid inlet chamber 20 receives fluid that is flowing therein in a general direction indicated by the arrow A. The fluid passes through the throttle device 24A of the first embodiment wherein the energy of high pressure fluid is reduced. The fluid then flows through the flow opening 68 and enters the throttle device 24B of the second embodiment where it undergoes a further reduction in energy before exiting the fluid outlet chamber 22 in a general direction indicated by the arrow A.

Figure 6:
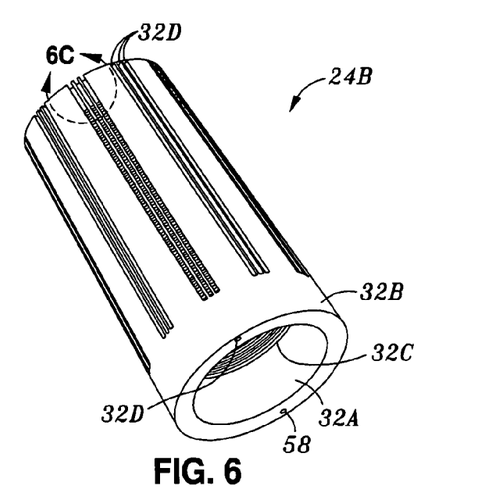
FIG. 6 is a perspective view of the throttle device showing illustrating a conical configuration of the inner sleeves.

Turning now to FIG. 2, shown is the throttle device 24A of the first embodiment illustrating the arrangement of the tubular inner sleeve 32 concentrically disposed and nested within the tubular intermediate sleeve 34, which in turn is concentrically disposed and nested within the tubular outer sleeve 36. As can be seen in FIG. 2, the inner, intermediate and outer sleeves 32, 34, 36 are cylindrically configured although the inner, intermediate and outer sleeves 32, 34, 36 may be conically configured, as shown in FIG. 6. It should be noted that many configurations are possible for providing concentrically disposed, nested sleeves. The sleeves may be affixed together by brazing or any other suitable means. The number of sleeves can be varied but may be limited by the geometry of structure surrounding the throttle device 24A, 24B, 24C. The tubular outer sleeve 36 defines the sleeve axis C and has an outer sleeve inner surface 36A and an outer sleeve outer surface 36B. A plurality of outer sleeve circumferential grooves 36C are formed on the outer sleeve inner surface 36A and a plurality of outer sleeve axial grooves 36D are formed on the outer sleeve outer surface 36B. The intersection of the outer sleeve circumferential grooves 36C with the outer sleeve axial grooves 36D forms outer sleeve orifices 36E extending through the outer sleeve 36.

The intermediate sleeve 34 has an intermediate sleeve inner surface 34A and an intermediate sleeve outer surface 34B. The intermediate sleeve 34 is sized and configured complimentary to and concentrically disposed within the outer sleeve 36 such that a substantial portion of the intermediate sleeve outer surface 34B contacts a substantial portion of the outer sleeve inner surface 36A. In this regard, the intermediate sleeve 34 is sized to form a close-tolerance fit with the outer sleeve 36 such that there is essentially no gap separating the outer sleeve 36 from the intermediate sleeve 34. The gap-free interface between the intermediate sleeve 34 and the outer sleeve 36 resists leakage of fluid therebetween. A plurality of intermediate sleeve circumferential grooves 34C are formed on the intermediate sleeve inner surface 34A and a plurality of intermediate sleeve axial grooves 34C are formed on the intermediate sleeve outer surface 34B. The intersection of the intermediate sleeve circumferential grooves 34C with the intermediate sleeve axial grooves 34D forms intermediate sleeve orifices 34E extending through the intermediate sleeve 34.

Likewise, the tubular inner sleeve 32 has an inner sleeve inner surface 32A and an inner sleeve outer surface 32B, as shown in FIG. 2. The inner sleeve 32 is sized and configured complimentary to and concentrically disposed within the intermediate sleeve 34 in telescoping fashion wherein a substantial portion of the inner sleeve outer surface 32B contacts a substantial portion of the intermediate sleeve inner surface 34A. The tight fit between the inner sleeve 32 and the intermediate sleeve 34 resists leakage of fluid therebetween. A plurality of inner sleeve circumferential grooves 32C are formed on the inner sleeve inner surface 32A and a plurality of inner sleeve axial grooves 32D are formed on the inner sleeve outer surface 32B. The intersection of the inner sleeve circumferential grooves 32C with the inner sleeve axial grooves 32D forms inner sleeve orifices 32E extending through the inner sleeve 32.

Figure 6A:
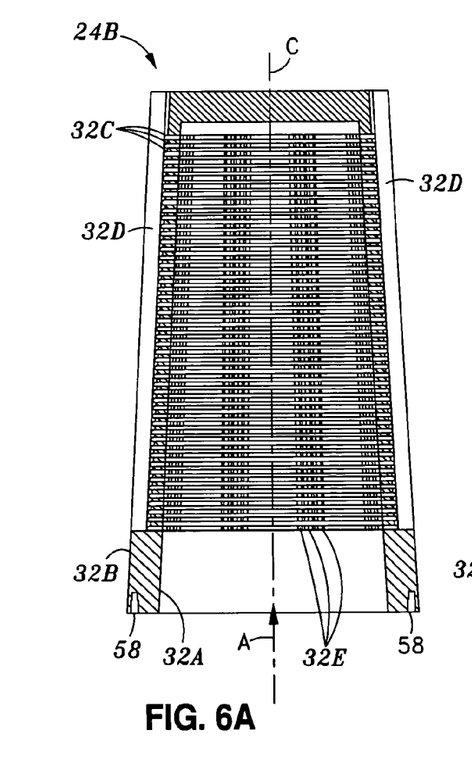
FIG. 6A is an elevational view of the throttle device of FIG. 6 illustrating a clustered arrangement of inner sleeve axial grooves.
Figure 6B:
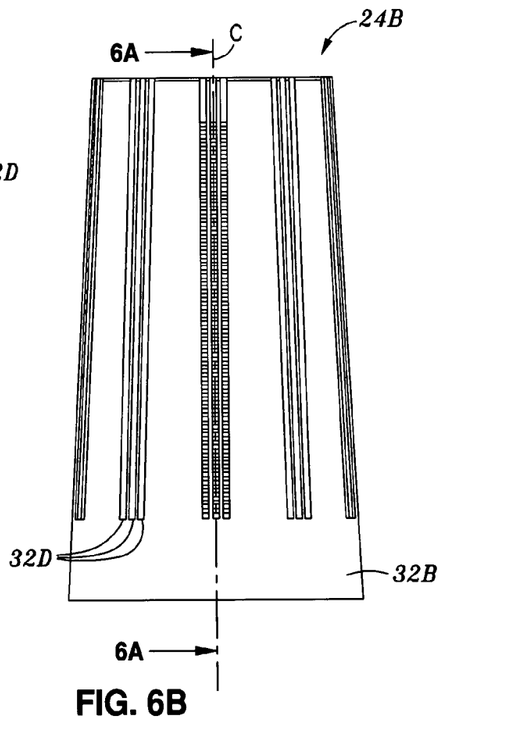
FIG. 6B is an cross-sectional view of the throttle device taken along line 6B—6B of FIG. 6A illustrating an end cap and inner sleeve circumferential grooves.

In the throttle device 24B of FIG. 3A, the outer sleeve 36 may be affixed to the inner sleeve 32 with an upper end 28 of the outer sleeve 36 optionally including a circumferential step 62 formed around the outer sleeve inner surface 36A. A complimentary circumferential shoulder 60 may be formed around the inner sleeve outer surface 32B to facilitate mating of the inner sleeve 32 with the outer sleeve 36. The throttle device 24B may be installed as shown in FIG. 1 by affixing the outer sleeve 36 to the valve housing 12 by means of a threadable connection or by welding. However, any alternative means for attaching the throttle device 24B may be utilized. Toward this end, machined elements such as tapped holes or recesses 58 may be included within the inner sleeve 32 such as are shown in FIG. 6A. Such recesses 58 may facilitate attachment of the inner sleeve 32 to adjacent structure. An end cap 54 may be disposed in sealing engagement with the inner sleeve 32 and outer sleeve 36 to close off the throttle device 24B at a lower end 30 thereof in order to force fluid through the inner and outer sleeves 32, 36. The end cap 54 may be planar or flat but may be provided with any convenient alternative shape. As can be seen in FIG. 2, the outer sleeve orifices 36E may be axially and circumferentially offset from the intermediate sleeve orifices 34E. Likewise, the intermediate sleeve orifices 34E may be axially and circumferentially offset from the inner sleeve orifices 32E.

The circumferential grooves 32C, 34C, 36C generally intersect the axial grooves 32D, 34D, 36D at an angle of about 90 degrees, although other angles are possible. The circumferential and axial grooves 32C, 34C, 36C, 32D, 34D, 36D of respective ones of the sleeves 32, 34, 36 define multiple tortuous flow paths D for fluid flowing through the throttle device 24A. FIG. 2 illustrates a possible pattern of a tortuous flow path as indicated by the sequence of arrows D. Fluid flowing inwardly from the throttle device 24A exterior to the throttle device 24A interior is received into the outer sleeve axial grooves 36D. The fluid then flows through the outer sleeve orifices 36E, along the outer sleeve circumferential grooves 36C, into the intermediate sleeve axial grooves 34D, through the intermediate sleeve orifices 34E, along the intermediate sleeve circumferential grooves 34C, into the inner sleeve axial grooves 32D, and through the inner sleeve orifices 32E before exiting the inner sleeve circumferential grooves 32C. The tortuous flow path D is reversed for fluid flowing outwardly from the throttle device 24A interior to the throttle device 24A exterior.

Advantageously, the inner, intermediate, and outer sleeves 32, 34, 36 may be adjusted relative to each other such that the inner, intermediate and outer sleeve orifices 32E, 34E, 36E are either aligned or offset with the circumferential and axial grooves 32C, 34C, 36C, 32D, 34D, 36D of an adjacent one of the sleeves 32, 34, 36. By offsetting the inner, intermediate and outer sleeve orifices 32E, 34E, 36E in a manner similar to that illustrated in FIG. 2, an individual tortuous flow path D, may be divided into two halves. Concurrently, both halves of the flow will change directions by about 90 degrees with each half flowing along a circumferential groove 32C, 34C, 36C in opposite directions until reaching a nearest one of the orifices 32E, 34E, 36E in an adjacent one of the sleeves 32, 34, 36.

At this point, the flow encounters an oppositely moving flow head-on. During the ensuing collision of the oppositely moving flows, energy of the fluid is reduced. If an equal number of orifices 32E, 34E, 36E are symmetrically formed within respective ones of the sleeves 32, 34, 36, then fluid will tend to flow along the axial and circumferential grooves 32C, 34C, 36C, 32D, 34D, 36D in an unbiased direction. But even if the orifices 32E, 34E, 36E are asymmetrically formed within respective ones of the sleeves 32, 34, 36 such that the individual flows are biased or equidirectional, energy losses will still continue within the fluid as the flows are joined when passing through the orifices 32E, 34E, 36E. Furthermore, additional energy losses will occur in the fluid due to the directional changes or turns in the tortuous flow paths D. Energy losses also occur from skin friction as the flowing fluid contacts the walls 56 of the circumferential and axial grooves 32C, 34C, 36C, 32D, 34D, 36D.

Various configurations of the axial and circumferential grooves 32C, 34C, 36C, 32D, 34D, 36D may be provided in respective ones of the sleeves 32, 34, 36 wherein the profile, quantity, and relative positions of the axial and circumferential grooves 32C, 34C, 36C, 32D, 34D, 36D may be altered. The configuration of the inner sleeve circumferential grooves 32C warrants special attention as the inner sleeve circumferential grooves 32C are a controlling factor in the flow characteristics of the fluid exiting the inner sleeve 32. Furthermore, the manner in which the fluid exits the inner sleeve 32 and impinges on the piston body 14 is a determining factor on the useful life or the maintenance intervals of the throttle device 24A. Thus, it is desirable for the fluid to exit the inner sleeve circumferential grooves 32C in a manner that will prevent the impact of the fluid directly upon the piston body 14 in a ray-like manner or as a concentrated stream flowing directly inwardly from the inner sleeve orifices 32E.

Figure 5:
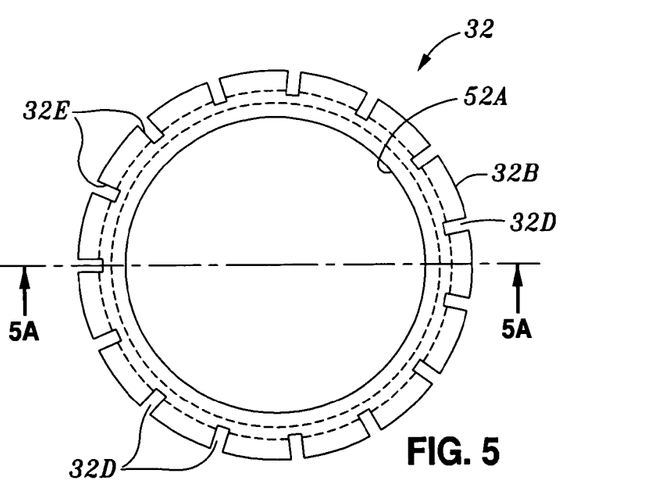
FIG. 5 is a top view of the inner sleeve of the throttle device in an alternative embodiment of the present invention.
Figure 5A:
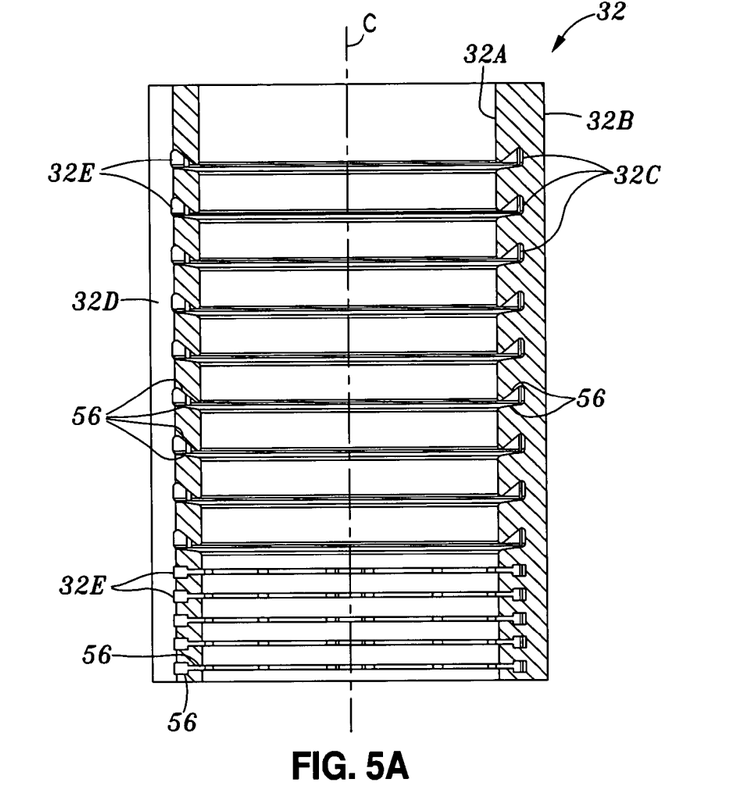
FIG. 5A is a cross-sectional view of the inner sleeve taken along line 5A—5A of FIG. 5 illustrating a configuration of the inner sleeve circumferential grooves wherein the cross-sectional shape and size thereof is variable along the inner sleeve.

Toward this end, each one of the inner sleeve circumferential grooves 32C may be configured with a cross-sectional shape that is undercut, as is shown in FIG. 5A. The undercut cross-sectional shape is of a generally decreasing size when viewed in a radially inward direction such that inner sleeve circumferential groove 32C is wider at a bottom portion thereof as compared to its width at the inner sleeve inner surface 32A. By configuring the cross-sectional shape in this manner, the fluid exiting the inner sleeve orifices 32E may flow inwardly in a more evenly distributed pattern around the inner sleeve circumferential groove 32C perimeter instead of in a ray-like or streaming pattern that would result in direct impingement on the piston body 14. FIG. 5A also illustrates a configuration of the inner sleeve 32 wherein the cross-sectional shape and size of the inner sleeve circumferential grooves 32C is variable along the inner sleeve 32.

As can be seen in FIG. 5A, the inner sleeve circumferential grooves 32C may have a smaller cross-sectional area adjacent a lower end 30 of the inner sleeve 32 relative to the cross-sectional area of the inner sleeve circumferential grooves 32C in a remaining portion of the inner sleeve 32. Such a configuration allows for a more controlled flow through the fluid control valve 10 when the fluid is flowing at low flow rates. Additionally, the exit angle of the fluid flow from the inner sleeve circumferential grooves 32C may be influenced. The inner sleeve circumferential grooves 32C may each include slanted walls 56, as illustrated in FIG. 5A. The slanted walls 56 are configured such that fluid exits the inner sleeve circumferential grooves 32C in a predetermined direction to avoid direct impingement on the piston body 14.

Turning now to FIG. 2, shown is a partially cut-away perspective view of the throttle device 24A of the first embodiment illustrating the concentrically disposed inner sleeve 32, intermediate sleeve 34 and outer sleeve 36 and showing the tortuous flow path D for fluid flowing inwardly through the throttle device 24A. As was earlier mentioned, each one of the tortuous flow paths D defines a cross-sectional area. In order to achieve certain control characteristics of the fluid control valve 10, the axial and circumferential grooves 32C, 34C, 36C, 32D, 34D, 36D of respective ones of the inner, intermediate and outer sleeves 32, 34, 36 may be configured such that the cross-sectional areas of the tortuous flow paths D will generally increase in an inwardly flowing direction of the fluid. However, the opposite may be devised if the flow is directed from the throttle device 24A interior to the throttle device 24A exterior. By configuring the throttle device 24A such that the cross sectional area of the axial and circumferential grooves 32C, 34C, 36C, 32D, 34D, 36D sequentially increases in the respective ones of the outer sleeve 36, intermediate sleeve 34 and inner sleeve 32, as is shown in FIG. 2, the velocity of the flow may be kept relatively low and thus the flow may be effectively controlled despite the simultaneous expansion of the fluid.

The increasing cross sectional area of the tortuous flow path D may be achieved by incrementally increasing the relative quantities of the axial and circumferential grooves 32C, 34C, 36C, 32D, 34D, 36D from the throttle device 24A exterior to the throttle device 24A interior. For example, in FIG. 2, the quantity of inner sleeve circumferential grooves 32C is approximately twice the quantity of intermediate sleeve circumferential grooves 34C. Despite the increase in the quantity of circumferential grooves 32C, 34C, 36C for flow moving from the throttle device 24A exterior to the throttle device 24A interior, energy losses are still induced within the flowing fluid as a result of changes in the flow direction and by skin friction. Advantageously, the high performance of the throttle device 24A in reducing energy of the flowing fluid is due to the increase in the number of turns in the tortuous flow paths D as well as the surface area of the circumferential and axial grooves 32C, 34C, 36C, 32D, 34D, 36D despite their relatively small size compared to an arrangement with a lesser quantity of the respective ones of circumferential and axial grooves 32C, 34C, 36C, 32D, 34D, 36D but having a relatively larger size.

It should be noted that FIG. 1 illustrates a preferred arrangement wherein the axial and circumferential grooves 32C, 34C, 36C, 32D, 34D, 36D are formed on the outer surfaces 32B, 34B, 36B and inner surfaces 32A, 34A, 36A with the piston body 14 being generally cylindrically configured to block the flow of fluid through the throttle device 24A. However, the throttle device 24A may also be configured such that the axial and circumferential grooves 32C, 34C, 36C, 32D, 34D, 36D are formed on respective ones of the inner surface 32A, 34A, 36A and outer surfaces 32B, 34B, 36B wherein the axial grooves 32D, 34D, 36D form a guide for an appropriately profiled piston body 14.

Turning now to FIGS. 4, 4A, 4B and 4C, shown is the throttle device 24C in a third embodiment illustrating the control piston 66 partially disposed therewithin. The throttle device 24C of the third embodiment is comprised of an inner stage 38 and an outer stage (not shown). The inner stage 38 is comprised of the tubular inner sleeve 32 having an inner sleeve inner surface 32A, an inner sleeve outer surface 32B and a plurality of circumferentially-spaced, axially-oriented, inner sleeve slots 42 formed through the inner sleeve 32, as can be seen in FIG. 4. Also included with the inner stage 38 is a stack of axially-spaced inner sleeve rings 44 affixed to the inner sleeve inner surface 32A, shown in FIG. 4A. The inner sleeve rings 44 may be affixed to the inner sleeve inner surface 32A by suitable means such as soldering and the like. Each of the inner sleeve rings 44 defines an inner perimeter 46, as can be seen in FIG. 4B. The inner sleeve inner surface 32A and the inner sleeve rings 44 collectively form a plurality of inner sleeve circumferential grooves 32C with a plurality of inner sleeve orifices 32E being formed at the intersection of the inner sleeve rings 44 and the inner sleeve slots 42.

The outer stage (not shown) may be configured similar to the inner stage 38 shown in FIG. 4A or it may be configured similar to the tubular outer sleeve 36 of the first embodiment 24A shown in FIG. 2. If configured similar to the inner stage 38 shown in FIG. 4A, the outer stage may comprise the tubular outer sleeve 36 having the outer sleeve inner surface 36A and the outer sleeve outer surface 36B. The outer sleeve 36 may further include a plurality of circumferentially-spaced, axially-oriented outer sleeve slots (not shown) formed therethrough. The outer stage may include a stack of axially-spaced outer sleeve rings (not shown) affixed to the outer sleeve inner surface 36A with each of the outer sleeve rings defining an inner perimeter. The outer sleeve rings may be affixed to the inner sleeve inner surface 32A by soldering or by other suitable joining techniques. The outer sleeve inner surface 36A and the outer sleeve rings collectively form a plurality of outer sleeve circumferential grooves 36C. A plurality of outer sleeve orifices 36E are formed at the intersection of the outer sleeve rings and the outer sleeve slots. If the outer stage is configured similar to the tubular outer sleeve 36 of the first embodiment 24A shown in FIG. 2, the outer sleeve circumferential grooves 36C and the outer sleeve axial grooves 36D may be formed at a depth such that the outer sleeve orifices 36E are formed at intersections of the outer sleeve circumferential grooves 36C and the outer sleeve axial grooves 36D. The outer sleeve 36 may be sized and configured complementary to the inner stage 38 to form a close-tolerance fit such that there is essentially no gap separating the inner stage 38 from the outer sleeve. In this same manner, the intermediate sleeve 34 may be interposed between the inner stage 38 and the outer sleeve 36. The intermediate sleeve 34 may be configured similar to the inner stage 38 shown in FIG. 4A or it may be configured similar to the configuration of the tubular intermediate sleeve 34 of shown in FIG. 2. Any number of sleeves or stages may be provided for the throttle device 24C. Such sleeves may be joined together by brazing or other suitable means, as was previously mentioned.

In the throttle device 24C of the third embodiment, the inner stage 38 is concentrically disposed within the outer stage such that a substantial portion of the inner sleeve outer surface 32B contacts a substantial portion of each one of the outer sleeve ring 36 inner perimeters. Similar to the configuration of the throttle device 24A of the first embodiment, the inner sleeve orifices 32E and the outer sleeve orifices 36E may be offset such that fluid flows into the outer sleeve slots, through the outer sleeve orifices 36E, through the outer sleeve circumferential grooves 36C, into the inner sleeve slots, through the inner sleeve orifices 32E, and through the inner sleeve circumferential grooves 32C to define multiple ones of the tortuous flow paths D for fluid flowing inwardly through the throttle device 24C. It is contemplated that the throttle device 24C of the third embodiment may comprise only an inner stage 38. Alternatively, the throttle device 24C may comprise an intermediate stage concentrically disposed between the inner stage 38 and the outer stage similar to the arrangement of the throttle device 24A of the first embodiment shown in FIG. 2. However, as was earlier mentioned, the throttle device 24C of the third embodiment may comprise any number of stages in order to achieve the desired fluid flow characteristics for a given application.

In order to avoid stepwise or discontinuous control characteristics of the fluid flow through the throttle devices 24A, 24B, 24C, the inner sleeve circumferential grooves 32C may be configured such that the end face 70 of the piston body 14 traverses at least two adjacent ones of the inner sleeve circumferential grooves 32C when the piston body 14 is disposed at any location along the inner sleeve 32. Toward this end, each of the inner sleeve rings 44 may be configured with an axially-undulating profile, as shown in FIG. 4C and as installed in FIG. 4A. The piston body 14 may additionally be sized and configured complimentary to the inner sleeve ring inner perimeter 46 and slidable within the stack of inner sleeve rings 44.

It should be noted that the throttle device 24A of the first embodiment may be arranged in a similar manner wherein the inner sleeve circumferential grooves 32C are configured such that the end face 70 of the piston body 14 traverses at least two adjacent ones of the inner sleeve circumferential grooves 32C at any position along the inner sleeve 32. When viewed from the side, the end face 70 is disposed normally to the direction of travel B of the piston body 14 such that the inner sleeve circumferential grooves 32C will be slanted with respect to the end face 70. In such an arrangement, the inner sleeve circumferential grooves 32C will be only partially covered by the piston body 14 such that fluid may still exit an uncovered portion of the inner sleeve circumferential grooves 32C.

In order to further control the flow characteristics of fluid exiting the inner sleeve 32, the inner sleeve rings 44 may be configured such that the cross-sectional configuration of the respective ones of the inner sleeve circumferential grooves 32C may be variable along the inner sleeve 32. Such a configuration may be accomplished by varying the thickness of the inner sleeve rings 44 along the inner sleeve 32. The relative spacing between adjacent inner sleeve rings 44 may also be varied in order to create inner sleeve circumferential grooves 32C of varying width. Furthermore, the inner sleeve rings 44 may be configured such that each of the inner sleeve circumferential grooves 32C has a cross-sectional area that is of generally decreasing size in a radially inward direction. Referring to FIG. 4C, the inner sleeve ring 44 is shown having an annular top surface 48 and an annular bottom surface 50.

The top surface 48 and bottom surface 50 may each be conically configured such that the cross-sectional thickness is greater at an inner perimeter of the inner sleeve ring 44 as compared to the cross-sectional thickness at an outer perimeter thereof. By tapering the cross-sectional configuration of the inner sleeve rings 44 such that the sleeve rings 44 are thicker at an inner perimeter 46 thereof relative to the outer perimeter, an arrangement may be created in each of the inner sleeve circumferential grooves 32C similar to the undercut configuration shown in FIG. 5A. In this manner, fluid exiting the inner sleeve orifices 32E may flow inwardly in a more evenly distributed pattern around the inner sleeve circumferential groove 32C perimeter, instead of in a ray-like or streaming pattern spraying from the inner sleeve orifices 32E that would result in direct impingement on the piston body 14.

Turning now to FIGS. 7 and 8, shown is a blow-off device 52 disposed within a casing 64 and illustrating the end cap 54 disposed in sealing engagement with the inner and outer sleeves 32, 36. The blow-off device 52 is configured for facilitating a reduction in the pressure of a fluid flowing outwardly therethrough. The blow-off device 52 comprises the tubular outer sleeve 36 defining the sleeve axis C and having the outer sleeve inner surface 36A and the outer sleeve outer surface 36B. The plurality of outer sleeve circumferential grooves 36C are formed on the outer sleeve inner surface 36A. The plurality of outer sleeve axial grooves 36D are formed on the outer sleeve outer surface 36B. The outer sleeve axial grooves 36D intersect the outer sleeve circumferential grooves 36C to form outer sleeve orifices 36E extending through the outer sleeve 36.

Also shown in FIG. 7 is the tubular inner sleeve 32 having the inner sleeve inner surface 32A and the inner sleeve outer surface 32B. The inner sleeve 32 is sized and configured complimentary to and concentrically disposed within the outer sleeve 36 such that a substantial portion of the inner sleeve outer surface 32B contacts a substantial portion of the outer sleeve inner surface 36A. The inner sleeve 32 may be affixed to the outer sleeve 36 by brazing or other suitable means. The plurality of inner sleeve circumferential grooves 32C are formed on the inner sleeve inner surface 32A. The plurality of inner sleeve axial grooves 32D are formed on the inner sleeve outer surface 32B. The inner sleeve axial grooves 32D intersect the inner sleeve circumferential grooves 32C to form inner sleeve orifices 32E extending through the inner sleeve 32. Also shown in FIG. 7 is the end cap 54 disposed in sealing engagement to the inner and outer sleeves 32, 36 for blocking fluid flowing along the sleeve axis C such that fluid flows outwardly through the inner and outer sleeves 32, 36. Alternative shapes or configurations may be provided for the end cap 54 of the blow-off device 52. For example, the end cap 54 may have a planar shape as shown in FIG. 7 or a hemispherical shape as shown in FIG. 8. The end cap 54 may be threadably attached to the blow-off device 52 or it may be attached by welding. However, the end cap 54 may be attached by any other suitable means.

In the blow-off devices 52 shown in FIGS. 7 and 8, the inner and outer sleeve orifices 34E, 36E are axially and circumferentially offset such that fluid flows into the inner sleeve circumferential grooves 32C, through the inner sleeve orifices 32E, through the inner sleeve axial grooves 32D, through the outer sleeve circumferential grooves 36C, through the outer sleeve orifices 36E, and exiting the outer sleeve axial grooves 36D to provide multiple tortuous flow paths D for fluid flowing outwardly through the throttle device 24B. In such a blow-off device 52, fluid under high pressure flows into an interior of the throttle device 24B and thereafter radially exits at an exterior of the throttle device 24B whereupon fluid pressure may be released to the atmosphere.

Advantageously, additional sleeves may be provided with the blow-off device 52 of FIGS. 7 and 8 because the geometric constraints are not as stringent as compared to the confined space of a fluid control valve 10 such as is illustrated in FIG. 1. The additional sleeves may be affixed to the throttle device 24B by brazing and the like. As can be seen in FIGS. 7 and 8, a relatively large area is provided between the outer sleeve 36 and the casing 64. The inner and outer sleeves 32, 36 are cylindrically configured although the inner and outer sleeves 32, 36 may be conically configured, similar to that shown in FIG. 6. However, it should be noted that many configurations are possible for providing concentrically disposed, nested inner and outer sleeves 32, 36.

Figure 6C:
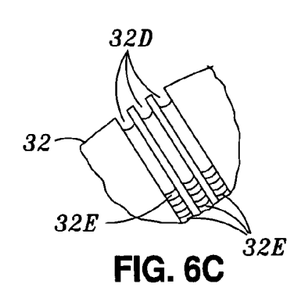
FIG. 6C is an enlarged partial perspective view taken along line 6C of FIG. 6 illustrating the inner sleeve axial grooves.

The outer sleeve axial grooves 36D may be formed in a portion of the outer sleeve outer surface 36B circumference such that fluid exits the outer sleeve 36 within a predetermined angular range wherein portions of the blow-off device 52 are devoid of orifices 36E. Importantly, the utilization of blow-off devices 52 having such an arrangement may help to prevent steam from directly impinging on nearby structural parts. Alternatively, selected areas of the inner sleeve 32 that are devoid of inner sleeve circumferential grooves 32C may serve the same purpose. In order to simplify manufacturing of the throttle device 24B, the inner sleeve axial grooves 32D may be arranged in a clustered pattern such as that shown in FIGS. 6, 6A and 6C. As is shown in FIG. 6C, the inner sleeve axial grooves 32D are arranged in groups of three around the inner sleeve outer surface 32B such that fluid flowing from an inside to an outside of the throttle device 24B may pass through the inner sleeve orifices 32E.

As can be seen, the throttle devices 24A, 24B, 24C and blow-off devices 52 of the present invention are configured with a simple construction that is relatively easy to manufacture. Assembly costs are low because of the limited number of components. Contrary to conventional prior art throttle devices, drilling of a large quantity of holes is not required. The circumferential and axial grooves 32C, 34C, 36C, 32D, 34D, 36D of respective ones of the inner, intermediate and outer sleeves 32, 34, 36 may be formed by high-speed machining and other suitable manufacturing techniques such as by casting or spark-erosion. The design philosophy of the throttle devices 24A, 24B, 24C of the present invention allows for a high degree of flexibility in varying the flow characteristics by simply altering the sizing and relative spacing of the axial and circumferential grooves 32C, 34C, 36C, 32D, 34D, 36D. Thus, the throttle devices 24A, 24B, 24C of the present invention may be easily adapted for use in a wide range of applications in order to achieve the required performance parameters.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A throttle device for facilitating a reduction in the pressure of a fluid flowing therethrough, the throttle device comprising:
   a tubular outer sleeve defining a sleeve axis and having an outer sleeve inner surface and an outer sleeve outer surface, a plurality of outer sleeve circumferential grooves being formed on the outer sleeve inner surface, a plurality of outer sleeve axial grooves being formed on the outer sleeve outer surface and intersecting the outer sleeve circumferential grooves to form outer sleeve orifices extending through the outer sleeve; and
   a tubular inner sleeve having an inner sleeve inner surface and an inner sleeve outer surface, the inner sleeve being sized and configured complimentary to and concentrically disposed within the outer sleeve such that a substantial portion of the inner sleeve outer surface contacts a substantial portion of the outer sleeve inner surface, a plurality of inner sleeve circumferential grooves being formed on the inner sleeve inner surface, a plurality of inner sleeve axial grooves being formed on the inner sleeve outer surface and intersecting the inner sleeve circumferential grooves to form inner sleeve orifices extending through the inner sleeve;
   wherein the inner and outer sleeve orifices are offset such that fluid flows into the outer sleeve axial grooves, through the outer sleeve orifices, through the outer sleeve circumferential grooves, through the inner sleeve axial grooves, through the inner sleeve orifices, and exits the inner sleeve circumferential grooves to define multiple tortuous flow paths for fluid flowing inwardly through the throttle device.

2. The throttle device of claim 1 wherein:
   each one of the tortuous flow paths defines a cross-sectional area;
   the outer sleeve axial and circumferential grooves and the inner sleeve axial and circumferential grooves being configured such that the cross-sectional areas of respective ones of the tortuous flow paths generally increase in an inwardly flowing direction of the fluid.

3. The throttle device of claim 2 wherein the cross-sectional area of the respective ones of the inner sleeve circumferential grooves is variable along the inner sleeve.

4. The throttle device of claim 1 wherein each of the inner sleeve circumferential grooves has a cross-sectional shape that is of generally decreasing size in a radially inward direction.

5. The throttle device of claim 1 wherein the inner sleeve circumferential grooves each include slanted walls which are configured such that fluid flowing inwardly through the throttle device exits the inner sleeve circumferential grooves in a predetermined direction.

6. The throttle device of claim 1 further comprising:
   a piston body sized and configured to be complimentary to and slidable within the inner sleeve inner surface, the piston body including an end face disposed on an end thereof;
   wherein each of the inner sleeve circumferential grooves is configured such that the end face traverses at least two adjacent ones of the inner sleeve circumferential grooves at any position along the inner sleeve.

7. The throttle device of claim 1 wherein the inner and outer sleeves are cylindrically configured.

8. The throttle device of claim 1 wherein the inner and outer sleeves are conically configured.

9. The throttle device of claim 1 further comprising:
   at least one tubular intermediate sleeve having an intermediate sleeve inner surface and an intermediate sleeve outer surface, the intermediate sleeve being sized and configured to be complimentary to and concentrically disposed between the inner and outer sleeves such that a substantial portion of the intermediate sleeve outer surface contacts a substantial portion of the outer sleeve inner surface and a substantial portion of the intermediate sleeve inner surface contacts a substantial portion of the inner sleeve outer surface, a plurality of intermediate sleeve circumferential grooves being formed on the intermediate sleeve inner surface, a plurality of intermediate sleeve axial grooves being formed on the intermediate sleeve outer surface and intersecting the intermediate sleeve circumferential grooves to form intermediate sleeve orifices extending through the intermediate sleeve;
   wherein the inner, intermediate and outer sleeve orifices are offset such that fluid flowing inwardly through the throttle device defines multiple tortuous flow paths.

10. The throttle device of claim 1 wherein the outer sleeve axial grooves are generally equally spaced about the outer sleeve outer surface.

11. The throttle device of claim 1 wherein the outer sleeve circumferential grooves are generally equally spaced in an axial direction along the outer sleeve inner surface.

12. The throttle device of claim 1 wherein the inner sleeve axial grooves are generally equally spaced about the inner sleeve outer surface.

13. The throttle device of claim 1 wherein the inner sleeve circumferential grooves are generally equally spaced in an axial direction along the inner sleeve inner surface.

14. A throttle device for facilitating a reduction in the pressure of a fluid flowing therethrough, the throttle device comprising:
   outer stage comprising:
   a tubular outer sleeve having an outer sleeve inner surface, an outer sleeve outer surface and a plurality of circumferentially-spaced, axially-oriented outer sleeve slots formed through the outer sleeve;
   a stack of axially-spaced outer sleeve rings affixed to the outer sleeve inner surface, each of the outer sleeve rings defining an outer sleeve ring inner perimeter; and
   the outer sleeve inner surface and the outer sleeve rings collectively forming a plurality of outer sleeve circumferential grooves, a plurality of outer sleeve orifices being formed at the intersection of the outer sleeve rings and the outer sleeve slots; and
   an inner stage comprising:
   a tubular inner sleeve having an inner sleeve inner surface, an inner sleeve outer surfaces and a plurality of circumferentially-spaced, axially-oriented, inner sleeve slots formed through the inner sleeve; and
   a stack of axially-spaced inner sleeve rings affixed to the inner sleeve inner surface, each of the inner sleeve rings defining an inner sleeve ring inner perimeter;
   the inner sleeve inner surface and the inner sleeve rings collectively forming a plurality of inner sleeve circumferential grooves, a plurality of inner sleeve orifices being formed at the intersection of the inner sleeve rings and the inner sleeve slots;
   wherein the inner stage is concentrically disposed within the outer stage such that a substantial portion of the inner sleeve outer surface contacts a substantial portion of each one of the outer sleeve ring inner perimeters, the inner and outer sleeve orifices being offset such that fluid flows into the outer sleeve axial slots, through the outer sleeve orifices, through the outer sleeve circumferential grooves, into the inner sleeve axial slots, through the inner sleeve orifices, and through the inner sleeve circumferential grooves to define multiple tortuous flow paths for fluid flowing inwardly through the throttle device.

15. The throttle device of claim 14 further comprising:
a piston body sized and configured to be complimentary to the inner sleeve ring inner perimeter and slidable within the stack of inner sleeve rings, the piston body including an end face disposed on an end thereof;
wherein the inner sleeve rings have an axially-undulating profile such that the end face traverses at least two adjacent ones of the inner sleeve circumferential grooves at any position along the inner sleeve.

16. The throttle device of claim 14 wherein:
each one of the inner sleeve rings has a cross-sectional configuration;
each one of the inner sleeve circumferential grooves has a cross-sectional configuration;
wherein the cross-sectional configuration of adjacent ones of the inner sleeve rings is variable such that the cross-sectional configuration of respective ones of the inner sleeve circumferential grooves is variable along the inner sleeve.

17. The throttle device of claim 16 wherein the inner sleeve rings are configured such that each one of the inner sleeve circumferential grooves has a cross-sectional area that is of generally decreasing size in a radially inward direction.

18. The throttle device of claim 14 wherein the inner sleeve rings each include annular top and bottom surfaces which are conically configured such that fluid flowing inwardly through the throttle device exits the inner sleeve circumferential grooves in a predetermined direction.

19. A throttle device for facilitating a reduction in the pressure of a fluid flowing therethrough, the throttle device comprising:
a tubular outer sleeve having an outer sleeve inner surface and an outer sleeve outer surface, a plurality of outer sleeve circumferential grooves being formed on the outer sleeve inner surface, a plurality of outer sleeve axial grooves being formed on the outer sleeve outer surface and intersecting the outer sleeve circumferential grooves to form outer sleeve orifices extending through the outer sleeve; and
a tubular inner sleeve nested within the outer sleeve and having an inner sleeve inner surface and an inner sleeve outer surface, the inner sleeve being sized and configured complimentary to the outer sleeve such that a substantial portion of the inner sleeve outer surface contacts a substantial portion of the outer sleeve inner surface, a plurality of inner sleeve circumferential grooves being formed on the inner sleeve inner surface, a plurality of inner sleeve axial grooves being formed on the inner sleeve outer surface and intersecting the inner sleeve circumferential grooves to form inner sleeve orifices extending through the inner sleeve;
wherein fluid flowing through the inner and outer sleeve defines multiple tortuous flow paths.

20. The throttle device of claim 19 wherein:
each one of the tortuous flow paths defines a cross-sectional area;
the outer sleeve axial and circumferential grooves and the inner sleeve axial and circumferential grooves being configured such that the cross-sectional areas of respective ones of the tortuous flow paths generally increase in an inwardly flowing direction of the fluid.

* * * * *